United States Patent [19]

Gilster et al.

[11] 4,330,902
[45] May 25, 1982

[54] DEVICE FOR BREAKING THE FORETOES OF SHEEP CARCASSES

[76] Inventors: Daniel D. Gilster, R.R. 2; Randall T. Kaupan, 519 Pleasant, both of Albert Lea, Minn. 56007

[21] Appl. No.: 218,471

[22] Filed: Dec. 22, 1980

[51] Int. Cl.³ ............................................. A22B 3/10
[52] U.S. Cl. ................................................... 17/1 R
[58] Field of Search ..................... 17/1 R, 45, 52, 44

[56] References Cited

U.S. PATENT DOCUMENTS 3,882,570  5/1975  Zwiep et al. ..................... 17/1 R
4,058,872  11/1977  Henry et al. ...................... 17/1 R Primary Examiner—Willie G. Abercrombie
Attorney, Agent, or Firm—William R. Laney

[57] ABSTRACT

A device for breaking the first joint of the forelegs of small animal carcasses during the slaughtering and processing of the animals, which device includes a pair of pivotally interconnected, manually operable, elongated handles. One of the handles carries a slotted leg-receiving subassembly at its end pivotally connected to the other handle. The second handle carries a tendon-cutting blade extending generally transversely to the longitudinal axis of the second handle, and spaced from the pivotal axis about which the handles pivot in their pivotal interconnection to each other.

10 Claims, 5 Drawing Figures

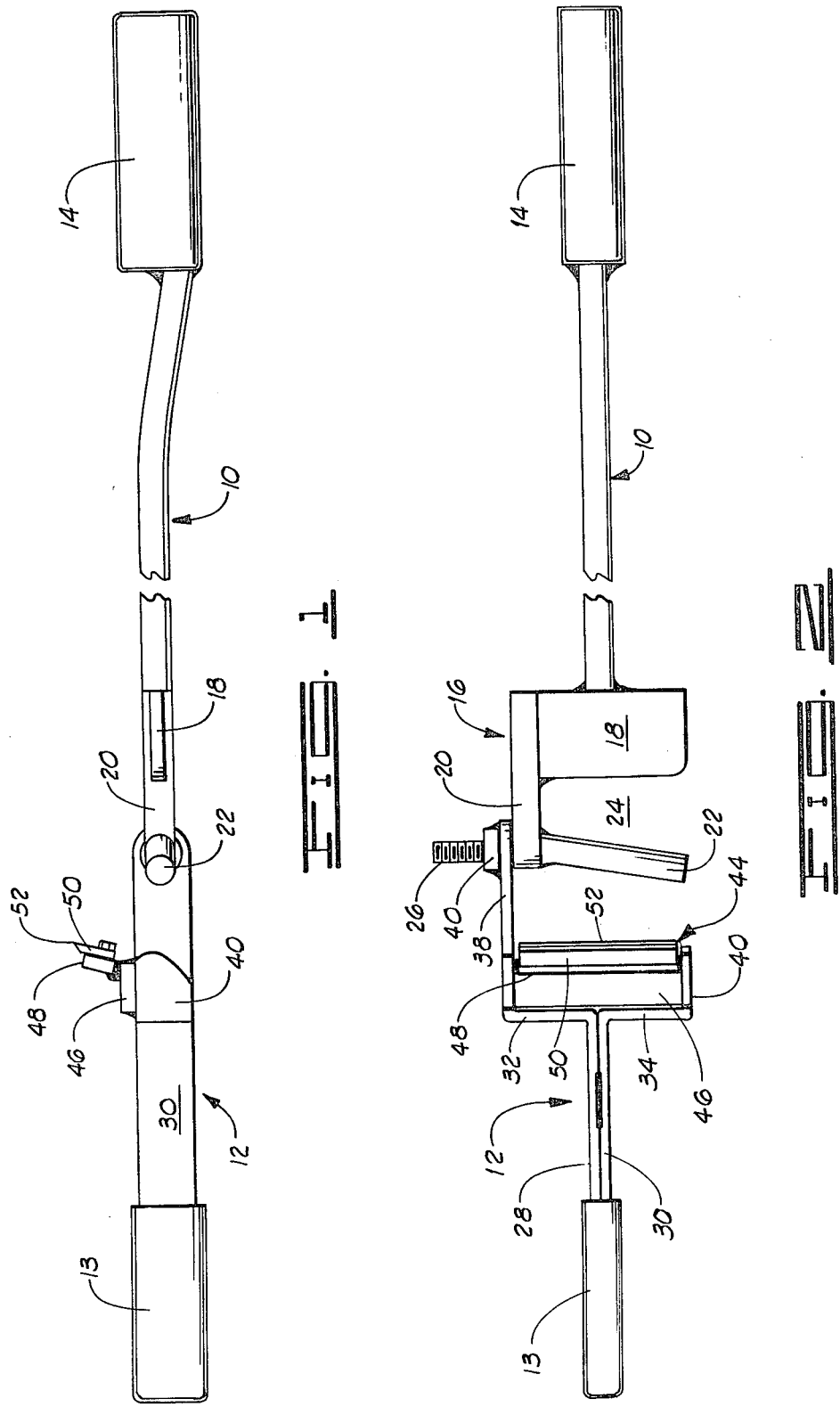

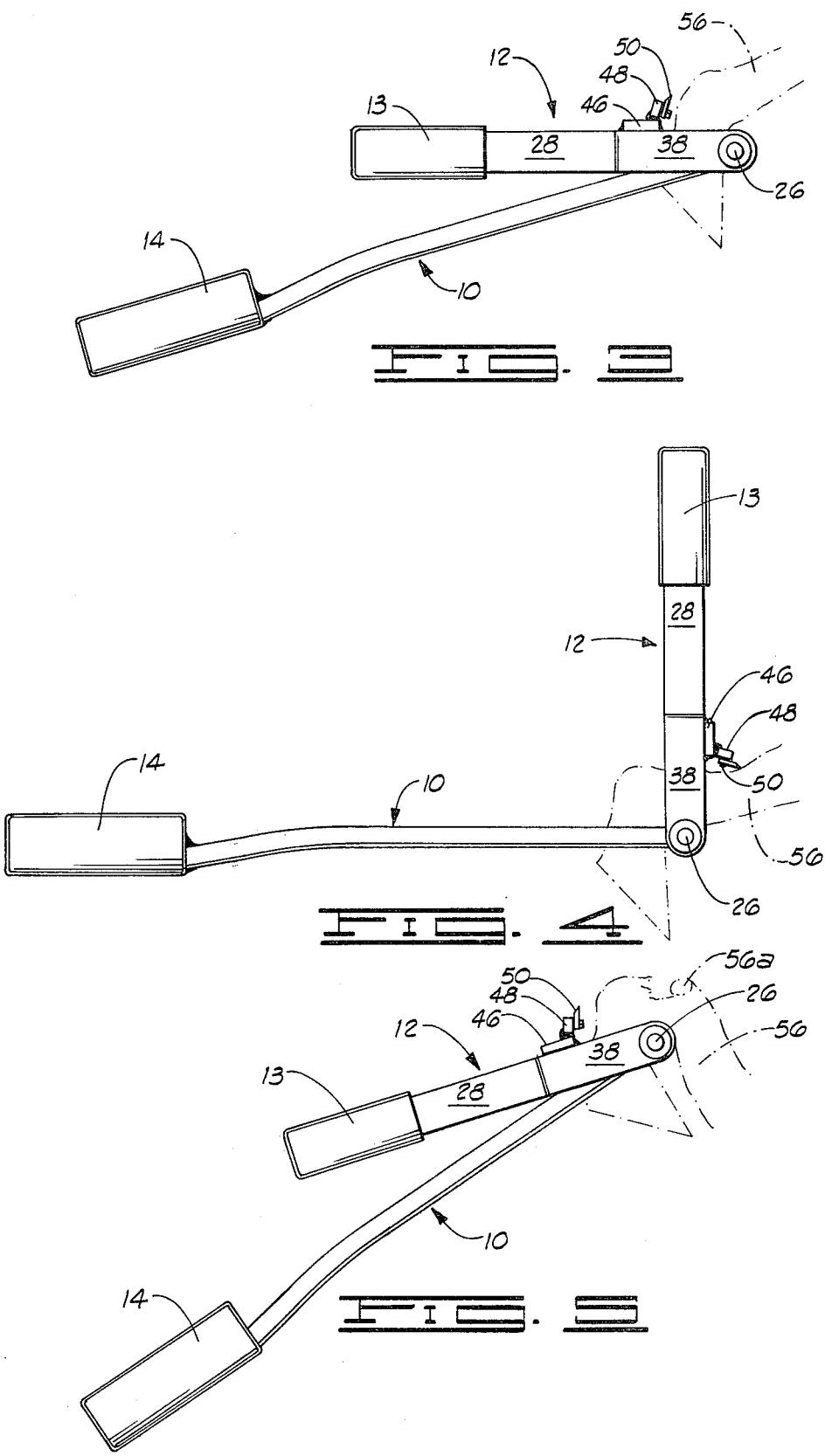

DEVICE FOR BREAKING THE FORETOES OF SHEEP CARCASSES

BACKGROUND OF THE INVENTION

1. Field of the Invention

This invention relates to meat processing, and more particularly, to a device for breaking the first joints of the forelegs of animal carcasses during slaughterhouse processing of the carcasses. The device has special utility in breaking the foretoes of sheep carcasses, although its usefulness is not confined to this operation.

2. Brief Description of the Prior Art

In the processing of sheep carcasses from the time of slaughtering to a state of readiness for the market, numerous operations must be performed upon each carcass. Many of these are carried out while the carcass is suspended head-down from a killing chain. One such operation carried out at this time is the breaking of the first joint in the forelegs of the carcasses—often referred to as "toe breaking."

The toe breaking phase of processing has, for the most part, heretofore been carried out manually, aided only by a knife. In such toe breaking, it is first necessary to sever the tendons of the foreleg at a location a short distance above the joint, followed by bending the toe relative to the axis of the foreleg until the joint snaps to expose the bone spool of the joint.

The task of the toe breaker is both tedious and physically fatiguing. The force required to snap the joints sometimes stresses the wrists of the toe breaker to the point of physical impairment, and in any event, the manual nature of the manipulations required necessarily limits the rate at which the carcasses can be processed through the toe breaking station.

Recently, a proposal has been forthcoming for mechanically, and to some extent automatically, accomplishing the toe breaking operation, thereby relieving the personnel at the toe breaking station from the necessity to manually, and with great physical exertion, snap the joints and sever the tendons. The mechanical apparatus which has been proposed for use in this operation is depicted and illustrated in U.S. Pat. No. 4,058,872. This structure, representing the closest known prior art to the present invention, operates primarily upon the principle of extending the forelegs of the sheep carcass into a bifurcated or U-shaped mechanical bracket structure, which bracket structure is then hydraulically pivoted, thus twisting the leg of the sheep in a way which breaks the forelegs at the first joint.

In the utilization of the toe breaker apparatus shown in U.S. Pat. No. 4,058,872, no attempt is apparently made to cut or sever the tendons in the leg of a sheep prior to breaking the toe at the first joint of the foreleg. This results, on occasion, in a break at the joint which does not cleanly expose the spool, and may instead expose sharp bone fragments.

BRIEF DESCRIPTION OF THE PRESENT INVENTION

The present invention, while not automatic and still requiring some physical strength in the utilization of the toe breaking device, nevertheless is a very significant improvement over the manual methods previously used to the present time, and is much less expensive and complicated in mechanism than the hydraulically operated toe breaking mechanism shown in U.S. Pat. No. 4,058,872. Moreover, the toe breaking device of the invention facilitates the toe breaking operation, and allows a clean break at the first joint to be accomplished, by initially drawing the foreleg tendons taut, then severing them, thus enabling the joint to be more easily broken in a second manipulative step carried out using the device.

Broadly described, the device of the present invention useful for breaking the first joint of the forelegs of animal carcasses, and especially sheep, comprises a pair of cooperating handles. These handles are interconnected near one of their ends in a scissor-like arrangement. At the end of one of the handles which is pivotally interconnected to the other handle, a slotted, leg-receiving subassembly is carried, and is constructed to facilitate the engagement of the foreleg of the sheep between a pair of rigid structural elements. The second of the handles carries a knife blade which extends generally transversely to the longitudinal axis of the second handle and is secured thereto at a location spaced from the pivotal axis disposed at the point of pivotal connection of the two handles to each other. The relative arrangement of leg-receiving subassembly, knife blade and the two handles is such that when the handles are pivoted relative to each other in one direction and about the pivotal axis at their point of pivotal connection, the knife blade is moved against, and cuts, the tendons in a foreleg which is simultaneously engaged by the leg-receiving subassembly. At this time, the tendons have been drawn tight by a stretching action effected upon the leg by the manipulation of the handles. After severing of the tendons, the handles may thereafter be moved to apply joint breaking leverage to the first joint of the engaged foreleg.

From the foregoing description of the invention, it will be perceived that the construction of the toe breaking device of the invention is relatively simple, and that there are few moving parts to malfunction. The device can be easily operated by a person having little training and, as contrasted with some hydraulically driven prior art devices, there is relatively little chance of an accident occurring during the utilization of the toe breaking device.

Another object of the invention is to provide a toe breaking device which greatly reduces the physical force required to break the first joints of the forelegs of animal carcasses carried on a slaughtering line, and thus reduces the tendonitis and muscle strain frequently experienced by workers accomplishing such breaking of these joints by a purely manual operation.

Additional objects and advantages of the invention will become apparent as the following detailed description of a preferred embodiment of the invention is read in conjunction with the accompanying drawings which illustrate such preferred embodiment.

BRIEF DESCRIPTION OF THE DRAWINGS

FIG. 1 is a side elevation view of the toe breaking tool of the invention as the same appears when the two handles forming portions of the device are pivoted apart from each other into a relationship in which they extend in substantially a common plane.

FIG. 2 is a plan view of the toe breaking device illustrated in FIG. 1.

FIG. 3 is a side elevation view of the toe breaking device of the invention in the position occupied by the handles thereof immediately prior to commencing the toe breaking operation, and after the foreleg of a sheep, shown in dashed lines, has been engaged by the toe breaking device.

FIG. 4 is a side elevation view illustrating the toe breaking device of the invention at the time when the first manipulative step toward breaking of the first joint of the foreleg of an animal carcass is carried out.

FIG. 5 is a side elevation view of the toe breaking device of the invention in the last stage of its use as the first joint of the foreleg is being broken by the use of the device.

DETAILED DESCRIPTION OF A PREFERRED EMBODIMENT OF THE INVENTION

Referring initially to FIG. 1 of the drawings, the toe breaking device of the invention includes a first elongated handle, designated generally by the reference numeral 10, and a second elongated handle, designated generally by reference numeral 12. The precise shape of these handles can be varied, but they in any event are configured and dimensioned to facilitate gripping of one of the handles in one hand and the other of the handles in the other hand. To this end, a hand grip 13 is shown secured to one end of the handle 12 and a hand grip 14 is shown secured to one end of the handle 10. At the opposite end of the handle 10, a slotted leg-receiving subassembly, designated generally by reference numeral 16 is located and is secured to the end of the handle 10 in the manner best illustrated in FIG. 2.

The leg-receiving subassembly 16 includes a breaker plate 18 which is a flat plate extending generally transversely across the longitudinal axis of the handle 10 and secured at a medial point along its length to the end of this handle. The breaker plate 18 is connected by a lateral web 20 to a breaker bar 22 of circular cross section which is spaced from the breaker plate 18 along the projected axis of the handle 10. It will be noted that the projected axis of the handle 10 substantially bisects a slot or space 24 which is provided between the breaker bar 22 and the breaker plate 18. The breaker bar 22 is secured to the lateral web 20 so as to project at an angle to the principal plane of this plate which affords a relatively wider opening at the open end of the slot or space 24 which gradually diminishes in its transverse width as the lateral web 20 is approached.

The breaker bar 22 and the breaker plate 18 are placed in substantially coplanar alignment with the longitudinal axis of the handle 10, as illustrated in FIG. 1, and are also located in coplanar alignment with an externally threaded projecting stub shaft 26 which projects normal to the opposite side of the web 20 from the side thereof from which the breaker bar 22 projects. The externally threaded stub shaft 26 is used for pivotally connecting the handle 10 and the leg-receiving subassembly 16 to the second handle 12 in a way and for a purpose hereinafter described.

The second handle 12 is formed of a pair of elongated plates 28 and 30 which are flatly abutted and spot welded to each other. The plates 28 and 30 are each bent through right angles at their aligned ends proximal to the handle 10 to form transversely extending arms 32 and 34, respectively. The plates are then bent through a second right angle to form parallel extending outer end portions 38 and 40. One terminal portion of the handle 12 will thus be seen to be bifurcated or U-shaped in configuration. The end portion 38 of the plate 28 is substantially longer than the end portion 40 of the plate 30, and adjacent the free end of the end portion 38 a hole is formed to receive the externally threaded stub shaft 26. A suitable journal or bearing element (not shown) can be placed around the threaded stub shaft 26 so that, when it is extended through the end portion 38 of the plate 28, and secured in this position by means of a nut 40 or the like, a pivotal connection is thereby formed which allows the handles 10 and 12 to pivot freely with respect to each other.

A knife blade subassembly, designated generally by reference numeral 44, is secured across the end portions 38 and 40 of the plates 28 and 30 at a location near the junction of these end portions with the transversely extending arms 32 and 34, respectively. The knife blade subassembly 44 includes a bar 46 which is welded across the upper sides of the end portions 38 and 40, as best shown in FIGS. 1 and 2 of the drawings. The bar 46 has a blade mounting block 48 welded to the upper side thereof adjacent the side edge of the bar nearest the point of pivotal connection of the handle 10. The blade mounting block 48 extends between the end portions 38 and 40, and is angled with respect to the major plane of the bar 46 as well as with respect to the longitudinal axis of the handle 12. Bolted to the side of the block 48 which faces toward the pivotal axis about which the handles 10 and 12 pivot is a tendon severing blade 50 which carries a knife edge 52 at its upper edge.

In the use of the toe breaking device of the invention, the handle 12 is first folded back in a counterclockwise direction from the position illustrated in FIG. 1 of the drawings, and the tool then inverted so that it occupies the position shown in FIG. 3. In this position, the leg-receiving subassembly 16 is oriented to receive between the breaker plate 18 and the breaker bar 22, the lower end portion of the foreleg of an animal carcass. The foreleg is placed in the slotted leg-receiving subassembly by passing the portion of the foreleg immediately above the hoof through the open end of the slot or space 24 between the breaker bar 22 and the breaker plate 18. The foreleg 56 of a sheep is illustrated in FIG. 3 of the drawings as thus engaged by the toe breaking tool in this fashion.

After the foreleg has been placed in the slot 24 of the leg-receiving subassembly 16, the hand grip 14 on the handle 10 is gripped in the right hand and the shorter handle 12 is gripped in the left hand. The handle 10 is pivoted downwardly so as to retain the bottom portion of the sheep's foreleg 56 within the leg-receiving subassembly. With the foreleg engaged by the device in the manner described, the handle 30 is then pivoted upwardly from the position shown in FIG. 3 to the position shown in FIG. 4. The handle 10 is concurrently pivoted downwardly sufficiently to keep the lowermost part of the foreleg bent to the position shown in both FIGS. 3 and 4. This bending of the foreleg by the downward leverage applied with the handle 10 tensions the tendons which extend up the back side of the foreleg above the first joint thereof. It is at this first joint of the foreleg that the bending of the foreleg through the angulation shown in FIGS. 3 and 4 occurs.

As pivotation of the handle 12 away from handle 10 continues, the knife edge 52 of the blade 50 is brought into contact with the back side of the foreleg 56 at a location where the tautly stretched tendons lie just beneath the skin of the foreleg. Continued pivotation of the handle 12 thus drives the knife blade into these tendons and severs them cleanly at a location above the first joint of the foreleg.

After cutting the tendons of the foreleg in the manner described, the handle 12 is then pivoted back to a location where it is positioned at the angulation shown in FIG. 5 relative to the handle 10. By gripping both the handles 10 and 12 at this time, and pivoting them down while lifting upwardly slightly at the point of engagement of the foreleg, the foreleg is snapped precisely at the first joint, as illustrated in FIG. 5, to expose the bone spool 56a forming a part of the joint. Breaking of the joint is accomplished cleanly and without the development of significant protruding bone spurs or jagged portions of bone. Upon completion of the breaking of the joint in the manner described, the handles 10 and 12 can be moved upwardly to relieve the pinching action on that portion of the foreleg immediately above the hoof, and the foreleg can then easily be slipped out of the wide end of the slot 24 in the leg-receiving subassembly 16. The toe breaking action can then be commenced upon the second foreleg of the carcass to break the first joint in the manner described.

Although a preferred embodiment of the invention has been herein described in order to afford guidance to those seeking to practice the invention, it is to be understood that the principles herein enunciated, and underlying the invention, are applicable to other forms and versions of the toe breaking device, in addition to that which is herein illustrated. Accordingly, variations in dimensions and specific geometric arrangements of parts in the inventive combination, which nevertheless continue to rely upon such principles, are deemed to be within the spirit and scope of the invention except as such modified forms may be necessarily excluded by the appended claims or reasonable equivalents thereof.

What is claimed is:

1. A device for breaking the first joints of the forelegs of animal carcasses comprising:
    a first elongated handle;
    a slotted, leg-receiving subassembly carried on one end of said first handle;
    a second elongated handle having an end pivotally connected to said one end of said first handle; and
    a knife blade secured to, and movable with, said second handle and extending substantially transversely to the longitudinal axis of the handle at a location spaced along the second handle from the point of pivotal connection of the handles to each other whereby when said handles are pivoted relative to each other about the pivotal axis at said point of pivotal connection, said knife blade is moved against, and cuts, tendons in a foreleg simultaneously engaged by said leg-receiving subassembly, and said handles may thereafter be moved to apply joint breaking leverage to the first joint of said engaged foreleg.

2. A device as defined in claim 1 wherein said slotted leg-receiving subassembly comprises:
    a breaker plate secured to said one end of said first handle;
    a breaker bar spaced from said breaker plate along the projected axis of said first handle; and
    means connecting said breaker plate and breaker bar and defining an open ended slot therebetween, said connecting means further pivotally interconnecting said first and second handles.

3. The device as claimed in claim 1 wherein the center of said knife blade is bisected by a plane containing the longitudinal axis of said second handle.

4. The device as claimed in claim 3 wherein said knife blade includes a cutting edge spaced from the longitudinal axis of said second handle.

5. A device as claimed in claim 1 wherein said handles pivot relative to each other in a common plane, and upon pivotation in one direction, said leg-receiving assembly and said knife blade move away from each other.

6. A device as claimed in claim 2 wherein said handles are positioned in substantially coplanar alignment with each other, said common plane of alignment extending as a bisecting plane through said knife blade, said breaker plate and said breaker bar.

7. A device as defined in claim 2 wherein said breaker bar is round in cross section and projects at an angle to the horizontal axis of said first handle to define, with said breaker plate, a configuration of said slot which includes a relatively greater slot width at the open end thereof.

8. A toe breaking apparatus comprising:
    a pair of pivotally interconnected cooperating handles;
    means carried on one of the handles for holding a hoofed animal carcass leg at a location immediately above the hoof; and
    means carried on the other of the handles for cutting tendons in the carcass leg, said handles, holding means and tendon cutting means being arranged relatively to each other to result in tensioning, followed by cutting, of the tendons when the handles are pivoted from a location where they define an acute angle between them to a location where they define an angle exceeding 90° with respect to each other while said holding means holds said leg.

9. A toe breaking apparatus as defined in claim 8 wherein said holding means includes a pair of rigid spaced elements adapted to receive the carcass leg therebetween, and frictionally hold the leg by contact of the rigid spaced elements with the leg when said one handle is pivoted relative to the leg.

10. A toe breaking apparatus as defined in claim 8 wherein said handles are pivotally interconnected adjacent their ends, and said cutting means comprises a knife blade carried on said other handle at a location spaced from the point of pivotal connection of said handles to each other.

* * * * *